United States Patent Office 3,663,525
Patented May 16, 1972

3,663,525
PREPARATION OF COPPER FORMAZYL DYES
Vincent G. Witterholt, Wilmington, Del., and John W.
Dalgarn, Bellmawr, N.J., assignors to E. I. du Pont
de Nemours and Company, Wilmington, Del.
No Drawing. Filed Nov. 6, 1968, Ser. No. 773,951
Int. Cl. C09b 45/18; D06p 3/24
U.S. Cl. 260—149
10 Claims

ABSTRACT OF THE DISCLOSURE

A process for preparing copper formazyl dyes by reacting alkoxy formazane compounds with a soluble copper salt. The reaction employs certain organic, nitrogen-containing solvents, such as pyridine, 2-methylpyridine, 3-methylpyridine, 4-methylpyridine, formamide, dimethylformamide and dimethylacetamide. When one of the formamides or dimethylacetamide is used, an acid acceptor such as sodium acetate is also added to the reaction medium.

BACKGROUND OF THE INVENTION (1) Field of the invention

This invention relates to a process for preparing 1:1 copper formazyl dyes by metalizing alkoxy formazane compounds with a copper salt. Many of these dyes have an attractive blue shade and all are useful in the dyeing of nylon.

(2) Description of the prior art

It is well known that polyamide (nylon) fibers are widely used in carpeting and automobile upholstery fabrics. The products are usually available in a wide variety of attractive colors which have been made possible by a continuing search by industry for better dyes, better methods of making them and for better means of application. Of the various kinds of dyes available, disperse dyes have been widely used for the dyeing of nylon, particularly full width nylon carpets where problems with streakiness are liable to occur. Level dyeings may be achieved with these dyes, but their lightfastness is generally not as good as with acid dyes which are harder to apply insofar as the problem of leveling is concerned.

The copper formazyl dyes produced in this invention are 1:1 metalized complexes which are recognized in the art as possessing outstanding dyeing qualities, particularly in lightfastness. The following structure (where R=H) is illustrative of a blue dye of this type.

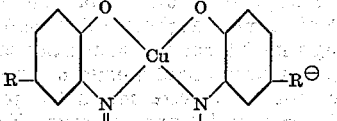

Various processes have been employed in the preparation of dyes of this type and an example of one such method is found in French Pat. 930,684.

It should be noted however that although copper formazyl dyes of this type produced through art known processes have been recognized for their outstanding qualities, particularly lightfastness, they have also been costly. The ortho hydroxy aniline compounds normally specified as basic intermediates for the dye manufacture are expensive, often costing far more than the corresponding ortho anisidine compounds, from which they are usually made. In addition the usual aqueous methods of metalization give neither clean reactions nor satisfactory results and yields.

The object of this invention is to provide a novel process for preparing selected dyes of the given formula which facilitates the use of ortho alkoxy amine compounds and further substituted ortho alkoxyamino compounds as intermediates which can be metalized cleanly to produce satisfactory yields of the type of dye described at a reduced cost.

SUMMARY OF THE INVENTION

The present invention comprises a process for preparing copper formazyl dyes comprising metalizing a formazane compound containing lower alkoxy groups ortho to both azo and hydrazonyl groups and containing no hydroxy groups, by heating said formazane compound in a mixture of a soluble copper salt and medium containing optionally 25% or less by weight of water and a solvent selected from the group consisting of pyridine, 2-methylpyridine, 3 - methylpyridine, 4 - methylpyridine formamide, dimethylformamide and dimethylacetamide. When formamide, dimethylformamide or dimethylacetamide is used an acid acceptor should also be present. The resultant dye is then removed. Various recovery methods may be employed for example slowly adding water to the reaction mixture to precipitate the dye in crystalline form, removing the coppered dye by filtration and washing to remove the solvent.

DESCRIPTION OF THE INVENTION

Diazotization and coupling which is necessary to produce the ortho-ortho' alkoxy unmetalized formazane compounds utilized as a starting material in the present invention may be achieved by any one of several art known procedures. A number of such methods are described in the previously mentioned French Pat. 930,684. The method of preparation of the formazane compounds has no effect on the subsequent metalization so long as the compounds produced are reasonably pure, however the ortho alkoxy amine compounds perform much more satisfactorily in diazotization and coupling reactions than the corresponding ortho hydroxy amino compounds.

It is felt that the important factor in the successful metalization of these formazane compounds is the use of certain designated solvents as the functioning media for these reactions. The solvents utilized are distinguished by their basic character and their ability to maintain the organic constituents in solution throughout the metalization reaction.

The choice of solvent or solvent mixture for conducting the metalization is influenced by consideration of ease of product isolation, cost of materials, processing cost, expected yield and safety factors. In Example 1 dimethylformamide with sodium acetate incorporated was utilized effectively and in Example 2 pyridine was used however 2 - methylpyridine, 3 - methylpyridine, 4 - methylpyridine, and mixtures thereof, formamide and dimethylacetamide may be used with equal effectiveness. The use of formamide, dimethylformamide and dimethylacetamide must however be attended by the presence of an acid acceptor of the type represented by sodium tartrate, sodium citrate, sodium formate, potassium acetate, and potassium formate may be utilized in this reaction, sodium acetate is preferred. The amount of solvent used may vary so long as the formazane compound and copper salt are completely in solution.

The metalization reaction is represented by the following equation:

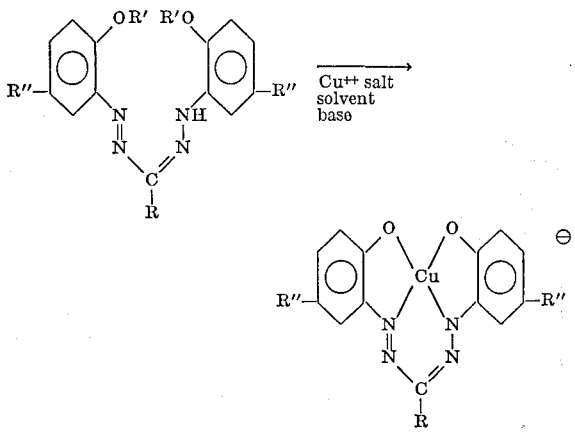

wherein:

R=CN or phenyl;
R'=CH$_3$, C$_2$H$_5$, C$_3$H$_7$, or C$_4$H$_9$;
R''=H, Cl, NO$_2$, C$_{1-2}$ alkyl or C$_{1-2}$ alkoxy.

In effecting this metalization the formazane compound to be metalized is put into solution in one of the solvents or solvent mixtures of the invention and a solution of a copper salt is added. For each 0.1 mole of formazane compound placed in solution, 0.2 mole of copper salt is added and, should the solvent utilized be other than a basic heterocyclic solvent, 0.2 mole of sodium acetate should likewise be present. As pointed out previously, the amount of solvent used however may vary so long as the formazane compound and copper salt are completely in solution at the usual reaction temperatures described below. The copper salt solution may be aqueous or it may be in a mixture of water and one of the solvents mentioned. While the exact water content of the reaction mixture is not critical, it preferably should not exceed 25%. The particular copper salt used is not critical however it should be soluble in the reaction mixture and members of the class represented by cupric sulfate, cupric chloride, cupric acetate and cupric nitrate are preferred.

The reaction is carried out at 75° to 110° C. until metalization is complete, a period of from 1 to 10 hours. The progress of the reaction may be observed by thin layer chromatography in the following manner. A sample of the reaction mass is dissolved completely by the addition of dimethylformamide. A spot of this solution is brought onto a silica gel coated glass plate, and after drying (1 minute on a hot plate at 160° C.) the spot is eluted with 3:2 blend of ethyl acetate and acetonitrile. Complete reaction can be detected by the gradual disappearance of a red band near the solvent front (starting material) and a red band at about half the distance between the origin and the solvent front (2:1 Cu complex) and the appearance of a blue band near the origin.

When metalization is complete, the mixture is cooled to 15° C. to 30° C., and the resultant metalized dye is recovered. The preferred method of recovery is adding water slowly to the reaction mixture to precipitate the dye in crystalline form, and removing the precipitated coppered dye by filtration subsequently washing it with water to remove solvent, however, any art known recovery method may likewise be employed such as utilizing a slowly added dilute acid in place of the slowly added water of the preferred method. The yield of metalized dye usually ranges from 60% to 80%.

The metalized dyes of this invention give dyeings of excellent lightfastness and possess satisfactory streakfree properties in general as can be seen in Examples 3–4. While dyeing may be carried out by any of the art known method, unusually superior streak free and lightfast results are obtained when the processes described in either Link and Pohland, copending U.S. patent application Ser. No. 699,773, filed Jan. 23, 1968, and now U.S. Pat. No. 3,592,534, or Liss and Vinton, copending U.S. patent application Ser. No. 448,278, filed Apr. 15, 1965, and now U.S. Pat. No. 3,488,240 are used.

EXAMPLES

The following examples are intended to be merely illustrative of the invention and not in limitation thereof. Unless otherwise indicated, all quantities are by weight.

EXAMPLE 1

Synthesis of 1,5-bis(2-methoxyphenyl)-3-cyanoformazane copper complex (a) Preparation of coupler solution: The preparation of this solution was timed so that it was available as soon as the diazo had been clarified.

Thirty parts of water were added to a suitable vessel, and 3.6 parts of cyanoacetic acid (100%) were added with agitation. This was followed by the addition of 22.5 parts of 30% caustic soda solution. The temperature of the slurry was adjusted to 0° to 5° C. by adding ice.

(b) Preparation of diazo: In a second vessel 37.5 parts of water were charged and cooled with ice to 0° to 5° C. then 21.3 parts of 31% hydrochloric acid were added with a sufficient amount of ice to maintain the temperature at 0° to 5° C. This was followed by the addition of 10 parts of ortho anisidine. Next 5.7 parts of sodium nitrite (100%) were added at an even rate over a 20 to 30 minute period. A test for excess nitrite was maintained for 1 hour, with the temperature at 0° to 5° C. A minimum amount of ice was used to maintain the temperature and a strong acid test on Congo Red paper was maintained. After one hour the excess of nitrite was destroyed by adding a minimum amount of sulfamic acid. Next 8.2 parts of Super Cel filter aid were added and stirred in for 10 minutes.

(c) Coupling: The charge was then clarified by filtration through a filter press into the well agitated coupler solution contained in the first vessel. Transfer was made over a period of 35 to 55 minutes, the temperature of the charge in the coupling tank being maintained with ice at 0° to 5° C.

Agitation was continued for at least 2 hours and the temperature allowed to slowly rise to 20° to 30° C. The pH in the coupling tank was maintained at 12±1, more caustic soda being added when necessary.

The finished charge was isolated by filtration in a filter press and washed with water until the water effluent had pH below 11.0. The excess water was blown out of the cake with air and it was then discharged and dried in an air oven at 70°–80° C. using non-metallic pans.

(d) Metalization: A suitable reactor (glass lined) was charged with 36 parts of dimethylformamide, and 10 parts of dry 1,5-bis(2-methoxyphenyl)-3-cyanoformazane was added along with 9.6 parts of anhydrous sodium acetate. The charge was stirred until a uniform slurry resulted. In a separate tank there were mixed 8.4 parts of cupric chloride dihydrate in 8.4 parts of water. The cupric chloride solution was run into the cyanoformazane solution over a 10 to 15 minute period and the charge was heated to 85° to 95° C. It was held at this temperature for 3 hours until the metalization was complete. Completion was detected by use of thin layer chromatography wherein a spot of a sample of the reaction mass, completely dissolved by the addition of dimethylformamide, was brought onto a silica gel coated glass plate. After drying (1 minute on a hot plate at 160° C.) the spot was eluted with a 3:2 blend of ethyl acetate and acetonitrile.

Complete reaction was detected by the gradual disappearance of a red band near the solvent front (starting material) and a red band at about half the distance between the origin and the solvent front (2:1 Cu complex)

and the appearance of a blue band near the origin. When the reaction was complete, the charge was allowed to cool to 25° to 30° C. and 100 parts of water were added over 20 to 30 minutes.

The product was isolated by filtration and washed with water to remove residual dimethylformamide. Excess water was blown or sucked out of the filter cake, and the cake removed from the filtration equipment. This dry product analyzed 18.5% copper versus 18.5% as theoretical.

Six other dyes of the series were prepared in the same manner by starting with similar molecular quantities of suitable formazanes as illustrated in Table I which gives melting point, wavelength in millimicrons of maximum color absorption and the logarithm of the molar extinction co-efficient, as defined in Venkataraman's book "Synthetic Dyes" published by Academic Press Inc., New York in 1952 in vol. 1, page 310. The formazane utilized in the reaction described above is designated as (A).

The corresponding dye resulting from its metalization is illustrated in Table II as (A/m). The remaining 6 formazanes (B) through (G) of Table I which were also prepared likewise have a corresponding resultant metalized dye in Table II.

TABLE I

[Formazanes $R_1-N=N-C(R_2)=N-NH-R_3$]

| Example Number | $R_1$ | $R_2$ | $R_3$ | M.P., °C. | $\lambda_{max}$ (log $\epsilon$) 80/20 DMAC/$H_2O$ |
|---|---|---|---|---|---|
| (A) | 4-$OCH_3$-phenyl | —CN | =$R_1$ | 141 | 495 (4.491) |
| (B) | 3,4-di-$OCH_3$-phenyl ($CH_3O$-, -$OCH_3$) | —CN | =$R_1$ | 133-136 | 510 (4.149) |
| (C) | 3,4-di-$OC_2H_5$-phenyl ($C_2H_5O$-, -$OC_2H_5$) | —CN | =$R_1$ | 125-130 | 511 (4.029) |
| (D) | 3-$CH_3$-4-$OCH_3$-phenyl | —CN | =$R_1$ | 168-173 | 499 (4.378) |
| (E) | 3-$O_2N$-4-$OCH_3$-phenyl | —CN | =$R_1$ | 295-285 | 615 (4.545) |
| (F) | 3-Cl-4-$OCH_3$-phenyl | —CN | =$R_1$ | 264-266 | 510 (4.667) |
| (G) | 2-$OCH_3$-phenyl | —$C_6H_5$ | =$R_1$ | 83-84 | 465 (3.840) |

TABLE II.—METALIZED FORMAZANES

| Example | Compound | M.P., °C. | $\lambda_{max}$ (log $\epsilon$) 80/20 DMAC/$H_2O$ |
|---|---|---|---|
| Metalized A | Cu complex of (A) with CN group | >282 | 626 (4.257) |
| Metalized B | Cu complex of (B) with CN group and $CH_3O$, $OCH_3$ substituents | 298-300 | 672 (4.139) |

TABLE II—Continued

| Example | Compound | M.P., °C. | $\lambda_{max}$ (log $\epsilon$) 80/20 DMAC/H$_2$O |
|---|---|---|---|
| Metalized C | (structure: Cu complex with two ethoxy-substituted phenyl rings, N=N, C-CN bridge) | 130–132 | 670(3.623) |
| Metalized D | (structure: Cu complex with two methyl-substituted phenyl rings, N=N, C-CN bridge) | >285 | 632(4.072) |
| Metalized E | (structure: Cu complex with two nitro-substituted phenyl rings, N=N, C-CN bridge) | >300 | 632(4.072) |
| Metalized F | (structure: Cu complex with two chloro-substituted phenyl rings, N=N, C-CN bridge) | >285 | 643(4.519) |
| Metalized G | (structure: Cu complex with two phenyl rings, N=N, C-C$_6$H$_5$ bridge) | >300 | 640(S)(4.062) |

EXAMPLE 2

Alternative metalization procedure

Ten parts of the formazane product of Example 1 part c was mixed with 30 parts of pyridine and 8 parts of sodium acetate. The mixture was heated to 90° C. and added to a solution of 7 parts of cupric chloride dihydrate dissolved in 7 parts of water. The resulting solution was heated at 90° C. until thin layer chromatogram tests indicated the disappearance of the orange band (starting material), which took approximately 3½ hours. The solution was then cooled to 40° C. and 30 parts of Cellosolve were added. Following this the solution was cooled to below 20° C., and 50 parts of 2 N hydrochloric acid were added, the temperature being held below 20° C. After stirring for 16 hours at room temperature and standing for 2 days, the solid product was isolated by filtration, and washed with water to remove residual pyridine.

Examples 3 and 4 below are portions of Examples 9 and 13 of copending U.S. patent application Ser. No. 699,773, filed Jan. 23, 1968, and now U.S. Pat. No. 3,592,584, and they are presented to illustrate how good lightfast dyeing can be obtained from the high purity dyes produced in the present invention.

EXAMPLE 3

Dyeing of bulked, continuous filament nylon carpet

The carpet used is backed with polypropylene or jute. It is comprised of 3700-denier 204-continuous filament, trilobal, jet-bulked yarn, melt-spun from poly(hexamethylene adipamide) flake. The yarn may be conveniently jet-bulked with a jet such as taught by Hallden et al. in U.S. Pat. 3,005,251. The carpet is first scoured in a bath containing 40 parts of water (based on carpet weight as 1), 0.01 part of a molar adduct of 20 moles of ethylene oxide and technical oleyl alcohol and .02 part commercial (26%) ammonium hydroxide. The scour is started at 43° C. and the temperature raised at 2° C. per minute to 82° C. and held there for 20 minutes. The bath is drained and the carpet rinsed well with clear water.

Dyeing is then carried out by adding to the vessel 40 parts of water at 27° C., .03 part of sodium citrate, and the temperature raised to 43° C. at 2° C. per minute. Next are added .02 part of monosodium phosphate and .03 part of dodecylbenzene sulfonic acid diethanolammonium salt, .005 part of the blue copper formazyl dye. The temperature is raised to boiling (99°–100° C.) at the rate of 2° C. per minute. The pH is maintained throughout at 6.5 to 7.5 by adding either disodium phosphate or acetic acid as required. Dyeing is continued for 2 hours at the boil until side to center levelness is reached. The bath is then dropped and the carpet is rinsed with clear water for 10 minutes. The rinse is repeated twice more and the carpet finally dried.

The dyeing assistant disodium dodecyldiphenylether disulfonate may be substituted for the dodecylbenzene sulfonic acid diethanolammonium salt with substantially equally good results.

The following lightfastness key was used to measure effectiveness of results:

| Rating | Indicates | Explanation |
| --- | --- | --- |
| 5 | No break | Negligible or no change. |
| 4 | Slight break | Slightly changed. |
| 3 | Moderate break | Noticeably changed. |
| 2 | Poor break | Considerably changed. |
| 1 | Severe break | Severely changed. | and the data obtained is contained in Table I.

A rating of 4 to 5 is usually regarded as acceptable fastness to light.

TABLE I

| Dyeing assistant | Hours exposure to xenon arc (FadeOmeter) | Lightfastness compared to std. (unexposed) |
| --- | --- | --- |
| Disodium dodecyldiphenyl ether disulfonate | 80 | 5 |
| Do | 240 | 5-4 |
| Dodecylbenzenesulfonic acid | 80 | 5 |
| Diethanolammonium salt | 240 | 5-4 |

EXAMPLE 4

Dyeing polyamide upholstery fabric

An upholstery fabric is knit of conventional polyamide yarns of 70-deiner, 34-filaments to the threads, the filaments being of round cross-section. The fabric piece is first scoured in the same manner as used in Example 3 for the polyamide carpet.

To the dyeing vessel is added, based on polyamide textile material, 40 parts of water, .015 part of disodium dodecyldiphenylether disulfonate, .02 part of ammonium acetate (or enough to adjust pH to 6.0), and the dye. The temperature is raised to boiling at the rate of 2° C. per minute and the bath boiled for 5 minutes. The bath is held at the boil for an additional 45 minutes and dropped. The material is thoroughly rinsed in clear water, removed and dried.

A solid color dyeing was made using .0025 part of the blue copper formazyl dye and the dyeings were streak-free and showed satisfactory levelness.

The embodiments of the invention in which an exclusive property or privilege is claimed are defined as follows:

1. A process for preparing copper formazyl dyes of the formula

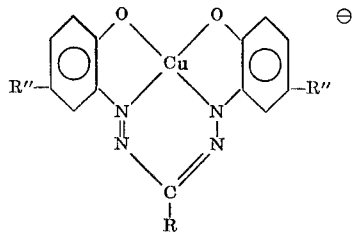

wherein R is CN or phenyl and R″ is H, Cl, said process comprising metalizing a formazane compound having the formula

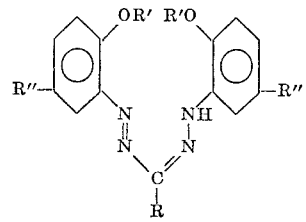

wherein R is CN or phenyl, R′ is CH₃ and R″ is H, Cl, or methyl and containing no hydroxy groups, by heating said formazane compound in a mixture of a soluble cupric salt and a solvent medium selected from the group consisting of:

(a) pyridine and
(b) formamide, dimethylformamide, dimethylacetamide, at a temperature of from 75° C. to 110° C. until metalization is complete with the proviso that 0.2 mole of cupric salt is added for each 0.1 mole of formazane compound added to the solution and that when a solvent from (b) is used the acid acceptor sodium acetate is also present, said mixture containing water and then recovering the resultant dye at a temperature of from 15° C. to 30° C.

2. A process according to claim 1 wherein the water content of the mixture is 25% or less by weight.

3. A process according to claim 1 wherein the recovery is effected by cooling the resultant metalized dye mixture to a temperature of from 15° C. to 30° C., slowly adding water to precipitate the coppered dye crystalline form, removing said dye by filtration and washing it to remove the solvent.

4. A process according to claim 1 wherein the soluble cupric salt is cupric sulfate.

5. A process according to claim 1 wherein the soluble cupric salt is cupric chloride.

6. A process according to claim 1 wherein the soluble cupric salt is cupric acetate.

7. A process according to claim 1 wherein the soluble cupric salt is cupric nitrate.

8. A process according to claim 1 wherein the solvent medium in which metalization of the formazane compound takes place is formamide and sodium acetate.

9. A process according to claim 1 wherein the solvent medium in which metalization of the formazane compound takes place is dimethylformamide and sodium acetate.

10. A process according to claim 1 wherein the solvent medium in which metalization of the formazane compound takes place is dimethylacetamide and sodium acetate.

References Cited

UNITED STATES PATENTS

| | | | |
| --- | --- | --- | --- |
| 2,864,815 | 12/1958 | Ziegler et al. | 260—149 |
| 3,068,219 | 12/1962 | Beffa et al. | 260—149 X |
| 3,109,840 | 11/1963 | Beffa et al. | 260—149 |
| 3,139,420 | 6/1964 | Beffa et al. | 260—149 |
| 3,185,676 | 5/1965 | Klein | 260—149 X |
| 2,789,975 | 4/1957 | Ruckstuhl | 260—147 |
| 3,041,328 | 6/1962 | Kraus et al. | 260—176 |
| 3,202,649 | 8/1965 | Steinemann et al. | 260—146 |
| 3,202,650 | 8/1965 | Steinemann et al. | 260—146 |
| 3,244,690 | 4/1966 | Steinemann et al. | 260—146 |

FLOYD D. HIGEL, Primary Examiner

PO-1050
(5/69)

UNITED STATES PATENT OFFICE
CERTIFICATE OF CORRECTION

Patent No. 3,663,525      Dated May 16, 1972

Inventor(s) Vincent G. Witterholt and John W. Dalgarn

It is certified that error appears in the above-identified patent and that said Letters Patent are hereby corrected as shown below:

Col. 10, line 1 should read -- wherein R is CN or phenyl and R" is H, Cl, or methyl, said process --

Signed and sealed this 3rd day of October 1972.

(SEAL)
Attest:

EDWARD M. FLETCHER, JR.                    ROBERT GOTTSCHALK
Attesting Officer                                 Commissioner of Patents